Patented Sept. 12, 1950

2,521,677

UNITED STATES PATENT OFFICE 2,521,677

PRODUCTION OF BETA-METHYL-MERCAPTO-PROPIONALDEHYDE

John C. Vander Weele, Midland, Mich., assignor to The Dow Chemical Company, Midland, Mich., a corporation of Delaware No Drawing. Application November 7, 1946,
Serial No. 708,464

7 Claims. (Cl. 260—601)

This invention concerns an improved method for the production of beta-methylmercapto-propionaldehyde, a compound useful as an intermediate in the manufacture of methionine.

It is known that beta-methylmercapto-propionaldehyde may be formed by reaction of methylmercaptan with acrolein and it has been taught that the reaction is catalyzed by the presence of mercuric salts. For instance, Keneko et al., J. Chem. Soc. Japan 59 1382 (1938), prepared the compound in small quantity by heating a mixture of 0.1 gram of mercuric methylmercaptide, 1.5 cubic centimeters of methylmercaptan and 1.2 grams of acrolein in a sealed tube at 65° C. for one hour, thereafter acidifying the mixture and extracting the product therefrom with ether. Although the reference indicates that the beta-methylmercapto-propionaldehyde was obtained in good yield, it has been my experience that such use of mercuric salts as catalysts for the reaction leads to erratic results, i. e. the yields vary widely and in most instances are considerably lower than reported by Keneko et al. Apparently, variable conditions other than use of a mercuric salt catalyst have far greater effect on the reaction than does such catalyst itself. In a companion article by Keneko, J. Chem. Soc. Japan 59 1139 (1938), on the use of mercuric salts as catalysts for the similar reaction of methylmercaptan with allyl alcohol to form gamma-methylmercapto-propyl alcohol, it is acknowledged that other factors such as light and air also exert catalytic effects in conjunction with that of the mercuric salts and data is tabulated showing that the results were highly erratic.

It is an object of this invention to provide a method and catalysts whereby methylmercaptan may be reacted with acrolein rapidly and conveniently to produce beta-methylmercapto-propionaldehyde consistently in good yields. A further object is to provide such method whereby the production of beta-methylmercapto-propionaldehyde may conveniently be accomplished in a continuous manner. Other objects will be apparent from the following description of the invention.

I have found that organic peroxides are highly effective as catalysts for the reaction of methylmercaptan with acrolein and that at room temperature or thereabout the reaction occurs with extreme rapidity in the presence of only a minor amount of such catalyst. I have further found that, when catalyzing the reaction with an organic peroxide, it is desirable that the reacting mixture be maintained at temperatures lower than 50° C., e. g. below 30° C. and preferably below 20° C., since at higher temperatures side reactions occur to a considerable extent and the yield of beta-methylmercapto-propionaldehyde is lower. The reaction is usually carried out at temperatures between —5° and 30° C., preferably between 10° and 20° C. I have still further found that the reaction in the presence of an organic peroxide catalyst occurs most rapidly and favorably at pressures not greatly in excess of atmospheric, i. e. pressures in the order of two atmospheres and higher have an effect of retarding the reaction. The reaction is usually carried out at atmospheric pressure or thereabout, but it can be accomplished at somewhat lower or higher pressures, e. g. at pressures of from 0.5 to 1.5 atmospheres.

In carrying out the reaction, a minor amount of an organic peroxide, e. g. diacetyl peroxide, dibenzoyl peroxide, or dilauroyl peroxide, etc., is dissolved in acrolein and methylmercaptan is passed into the solution. The acrolein used may advantageously be freshly-distilled, since acrolein which has been in storage and has been permitted to absorb oxygen, though operable, is sometimes erratic in chemical behavior. The organic peroxide is usually employed in amount corresponding to between 0.2 to 1.5 per cent of the weight of the acrolein, but it may be used in somewhat smaller, or considerably larger, proportions if desired. In this connection, it may be mentioned that at least a portion of the peroxide is consumed, or decomposed, during the reaction. When carrying the reaction out in batchwise manner, it is convenient initially to add only a portion of the peroxide required for completion of the reaction, e. g. an amount corresponding to 0.1 per cent of the weight of acrolein, and thereafter to add further small portions of peroxide as necessary for continuance of the reaction substantially to completion at a rapid rate. Diacetyl peroxide has been found to be particularly effective as a catalyst and is preferred.

The catalytic reaction of methylmercaptan and acrolein occurs very rapidly and is highly exothermic. Accordingly, cooling is usually necessary in order to maintain the mixture at a suitable reaction temperature. Cooling may be accomplished in any of the usual ways, such as by partial immersion of the reaction vessel in a bath of ice-water or other refrigerant, or by passing a cooling fluid through coils immersed in the reaction mixture, etc.

The introduction of methylmercaptan is usually continued until 70 per cent or more, and preferably in excess of 90 per cent, of the acrolein is consumed. However, the reaction may be stopped short of 70 per cent completion or the methylmercaptan may be added in excess. The state of completion of the reaction may at any time be determined roughly, but conveniently, by measuring the density of the reaction mixture. As the reaction progresses, the density increases from about 0.84 at 20° C. to a value in the range of from 1.025 to 1.05 at 15° C. Usually, the methylmercaptan is employed in amount corresponding approximately to the molecular equivalent of the acrolein.

As hereinbefore indicated, the organic peroxide is advantageously added, during the reaction, in small portions such that it is substantially decomposed when the reaction is terminated. However, if the reacted mixture is found to retain an appreciable amount of peroxide, the latter is preferably decomposed in usual ways, e. g. by adding a minor amount of an alkali such as sodium or potassium carbonate and warming the mixture. When the reacted mixture is substantially free of the peroxide, the beta-methylmercaptopropionaldehyde product may be separated by fractional distillation.

Instead of operating batchwise, as just described, the reaction may be carried out in continuous manner by passing methylmercaptan and a solution of a peroxide in acrolein countercurrent to one another through a reaction zone while maintaining the mixture in said zone at temperatures below 30° C., and preferably between 10° and 20° C., e. g. by external cooling. A vertical, or inclined, column may conveniently be used as the reaction chamber with feed of the acrolein and peroxide solution into an upper section thereof and feed of the methylmercaptan into a lower section of the column. The rates of flow are preferably such that little, if any, methylmercaptan is swept from the reaction zone with the outflowing liquid mixture and such that a major portion, preferably more than 90 per cent, of the acrolein is consumed. Portions of the mixture flowing from the lower end of the reaction column may be withdrawn from time to time and analyzed to determine its content of peroxide, unreacted methylmercaptan and unreacted acrolein. The relative rates of inflow of the several starting materials may then be adjusted so as to reduce each of these values to a minimum. Under ideal operating conditions the reacted mixture retains only a trace, e. g. less than 0.05 per cent, of the peroxide and less than 5 per cent by weight of methylmercaptan or acrolein. If the mixture flowing from the reaction zone is found to retain a larger proportion of peroxide, a minor amount of sodium carbonate, or other alkali may advantageously be added to promote decomposition of the peroxide.

The mixture flowing from the reaction zone is preferably collected and stored, e. g. for an hour or longer, after which it is distilled, but it may be passed directly to a still if desired. In most instances, such intermediate storage results in a small, but appreciable, increase in yield of the beta-methylmercapto-propionaldehyde product, due presumably to continuance, during storage, of the reaction to form the product. The distillation to separate the beta-methylmercapto-propionaldehyde is preferably carried out under vacuum. It may be accomplished batchwise or in continuous manner, as desired. Any acrolein or methylmercaptan recovered in the distillation may be returned to the reaction.

The following example describes one way in which the principle of the invention has been applied, but is not to be construed as limiting the invention.

Methylmercaptan was passed into a solution of 74 grams of freshly-distilled acrolein and 0.3 gram of diacetyl peroxide until the density of the mixture had increased to a value of 1.050 at 15° C. During introduction of the methylmercaptan, the mixture was maintained at temperatures between 10° and 15° C. by external cooling of the reaction vessel. Also, 0.9 gram of diacetyl peroxide was added in small portions while introducing the methylmercaptan. After completing the reaction, the mixture was fractionally distilled under vacuum. There were obtained 3 grams of methylmercaptan, 1.5 grams of acrolein, 3 grams of an intermediate fraction, 116 grams of beta-methylmercapto-propionaldehyde and 7.5 grams of residual higher boiling material. The yield of beta-methylmercapto-propionaldehyde was approximately 86 per cent of theoretical, based on the acrolein consumed.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of making beta-methylmercapto-propionaldehyde, the step of reacting methylmercaptan with liquid acrolein in the presence of a minor amount of an organic peroxide as a catalyst.

2. In a method of making beta-methylmercapto-propionaldehyde, the step of passing methylmercaptan into a solution of a minor amount of an organic peroxide in a major amount of liquid acrolein, while maintaining the mixture at a pressure not greatly higher than atmospheric and at temperatures between —5° and 30° C., and continuing introduction of the methylmercaptan until the reaction mixture has increased in density to a value of between 1.025 and 1.05 at 15° C.

3. In a method of making beta-methylmercapto-propionaldehyde, the steps of passing methylmercaptan into acrolein, having a catalytic amount of diacetyl peroxide dissolved therein, while maintaining the mixture at approximately atmospheric pressure and at temperatures between 10° and 20° C., continuing introduction of the methylmercaptan until the mixture has a density between 1.025 and 1.05 at 15° C., and thereafter separating the beta-methylmercapto-propionaldehyde product.

4. A method for the production of beta-methylmercapto-propionaldehyde in continuous manner which comprises feeding acrolein, containing a catalytic amount of an organic peroxide dissolved therein, into an upper section of a reaction chamber, and simultaneously feeding methylmercaptan into a lower section of the chamber while maintaining the reacting mixture at a pressure not greatly higher than atmospheric and at temperatures between —5° and 30° C., continuously withdrawing the mixture from a lower section of the chamber and fractionally distilling the withdrawn material to separate the beta-methylmercapto-propionaldehye product.

5. A method, as described in claim 4, wherein the relative rates of flow of the methylmercaptan and acrolein are such as to form an approximately equimolecular mixture thereof.

6. A method, as described in claim 4, wherein the relative rates of flow of the methylmercaptan and acrolein are such as to form an approximately equimolecular mixture thereof, the organic peroxide consists principally of diacetyl peroxide, and the reaction is carried out at temperatures between 10° and 20° C.

7. The method of preparing β-methylmercaptopropionaldehyde which comprises reacting methyl mercaptan and acrolein at normal atmospheric pressure and at a temperature below the reflux temperature of acrolein in the presence of benzoyl peroxide.

JOHN C. VANDER WEELE.

REFERENCES CITED

The following references are of record in the file of this patent:

UNITED STATES PATENTS

| Number | Name | Date |
|---|---|---|
| 2,352,435 | Hoeffelman et al. | June 27, 1944 |
| 2,432,429 | Lecky | Dec. 9, 1947 |
| 2,432,478 | Lecky | Dec. 9, 1947 |

OTHER REFERENCES

Rothstein "Jour. Chemical Society," (London), 1940, pages 1560–1563.

Kaneko et al., "Chemical Abstracts," vol. 33 (1939), page 2106. Abstract of "Jour. Chemical Society Japan," vol. 59, (1938), pages 1382–1384.